US012329698B2

(12) United States Patent
Li et al.

(10) Patent No.: US 12,329,698 B2
(45) Date of Patent: Jun. 17, 2025

(54) TRANSFER MACHINE

(71) Applicants: SHENZHEN MAIKANGXIN MEDICAL ROBOT CO., LTD, Shenzhen (CN); Qian Li, Shenzhen (CN)

(72) Inventors: Qian Li, Shenzhen (CN); Xuehai Zhang, Shenzhen (CN); Tianqi Zhao, Shenzhen (CN); Yuanchen Li, Shenzhen (CN)

(73) Assignees: SHENZHEN MAIKANGXIN MEDICAL ROBOT CO., LTD, Shenzhen (CN); Qian Li, Shenzhen (CN)

( * ) Notice: Subject to any disclaimer, the term of this patent is extended or adjusted under 35 U.S.C. 154(b) by 353 days.

(21) Appl. No.: 17/945,080

(22) Filed: Sep. 14, 2022

(65) Prior Publication Data

US 2023/0218459 A1 Jul. 13, 2023

(30) Foreign Application Priority Data

Jan. 7, 2022 (CN) ......................... 202220034014.5

(51) Int. Cl.
*A61G 5/10* (2006.01)

(52) U.S. Cl.
CPC ......... *A61G 5/1059* (2013.01); *A61G 5/1091* (2016.11)

(58) Field of Classification Search
CPC .. A61G 5/1059; A61G 5/1091; A61G 7/1059; A61G 7/1019; A61G 7/1046
See application file for complete search history.

(56) References Cited

U.S. PATENT DOCUMENTS 4,552,404 A * 11/1985 Congleton ............. A47C 9/005 297/445.1
2007/0096525 A1* 5/2007 McElhinney .......... A61G 5/104 297/339
2011/0227379 A1* 9/2011 Fogleman ............ A61G 7/1046 254/2 R
2019/0350411 A1* 11/2019 Hart ..................... A61G 5/1002
2022/0313511 A1* 10/2022 Li ........................ A61G 5/1059

* cited by examiner

*Primary Examiner* — David R Hare
*Assistant Examiner* — George Samuel Gines

(57) ABSTRACT

A transfer machine includes a main body assembly and a lifting assembly. The main body assembly includes two lifting rods capable of moving up and down and two seat plates facing the lifting rods. Each seat plate can rotate around the corresponding lifting rod thereby enabling the two seat plates to close or separate from each other. The lifting assembly includes a base, a connecting rod and a control assembly fixedly connected to the lifting rods. The base includes two guiding rods extending up and down, and each lifting rod can move in the up-down direction along the guiding rod. The control assembly includes a pushing rod, connected to the connecting rod; and a drive arm, driving the lifting rods to move in the up-down direction, thereby driving the main body assembly to move up and down. The connecting rod includes two foot sections.

7 Claims, 3 Drawing Sheets

TRANSFER MACHINE

TECHNICAL FIELD

The present disclosure relates to the field of medical device technologies, and in particular to a transfer machine.

BACKGROUND

A transfer machine as a medical device is applied in the field of elderly care to solve the problem of moving elderly people with limited mobility between wheelchairs and sofas, beds, toilets, seats, etc., for the purpose of interchanging positions between beds, wheelchairs, sofas, bathrooms, etc., as well as for walking, toileting, hanging needles, etc., thereby significantly reducing the work intensity of caregivers.

However, the transfer machine on the market has a single function, and its application is limited to simple mobility, walking, toileting and hanging needles. The problem of how to control the height between a body and a foot pedal of the transfer machine to fit a required preset height needs to be solved.

SUMMARY OF THE DISCLOSURE

The present disclosure provides a transfer machine, to solve the problem that the foot pedal of the transfer machine cannot be adapted to the required height of the main body assembly.

To solve the above problem, the present disclosure proposes a transfer machine, including:

a main body assembly, comprising two lifting rods capable of moving along an up-down direction and two seat plates each facing a corresponding lifting rod; wherein each seat plate is capable of rotating around the corresponding lifting rod thereby enabling the two seat plates to close or separate from each other;

a lifting assembly, comprising a base, and a connecting rod and a control assembly fixedly connected to the two lifting rods;

wherein the base comprises two guiding rods extending in the up-down direction, and each lifting rod is capable of moving in the up-down direction along a corresponding guiding rod;

wherein the control assembly comprises a pushing rod and a drive arm, the pushing rod being fixed connected to the connecting rod, the drive arm driving the two lifting rods to move in the up-down direction, thereby driving the main body assembly to move in the up-down direction;

wherein the connecting rod comprises two foot sections.

In some embodiments, the two lifting rods are each vertically arranged on the base, each lifting rod is sleeved on the corresponding guiding rod in the up-down direction, and a circumference of each lifting rod is connected to the connecting rod.

In some embodiments, the connecting rod comprises two first connections and two second connections, each first connection being connected to a corresponding lifting rod and each second connection being connected to the pushing rod; each foot section is located between a corresponding first connection and a corresponding second connection.

In some embodiments, a reinforcement structure is further arranged between each foot section and the corresponding first connection and/or between each foot section and the corresponding second connection.

In some embodiments, the reinforcing structure is arranged with a curved bending part.

In some embodiments, each seat plate comprises a left seat plate and a right seat plate, and an alignment hole is defined at a closing of the left seat plate or the right seat plate;

the transfer machine further comprises a snap and an alignment pin, and the alignment pin cooperates with the snap through the alignment hole to close the left seat plate and the right seat plate.

In some embodiments, the control assembly comprises a hydraulic assembly comprising the pushing rod; the drive arm is configured to drive the hydraulic assembly to make the pushing rod rise or fall.

In some embodiments, a foot pedal is arranged on each foot section.

The technical solution in the present disclosure solves the problem that the commercially available foot pedal of the transfer machine cannot be adapted to the required height of the main body assembly by setting the control assembly and pushing rod to drive the lifting rod and connecting rod to rise and fall, and further driving the main body assembly to rise and fall.

BRIEF DESCRIPTION OF THE DRAWINGS

In order to more clearly illustrate the technical solution in the present disclosure or prior art, the following is a brief description of the accompanying drawings that need to be used in the description of embodiments of the present disclosure or prior art. It is obvious that the accompanying drawings in the following description are only some embodiments of the present disclosure, and for those skilled in the art, other drawings may be obtained from the structure illustrated in these drawings without creative effort.

REFERENCE NUMERALS

Figure 1:
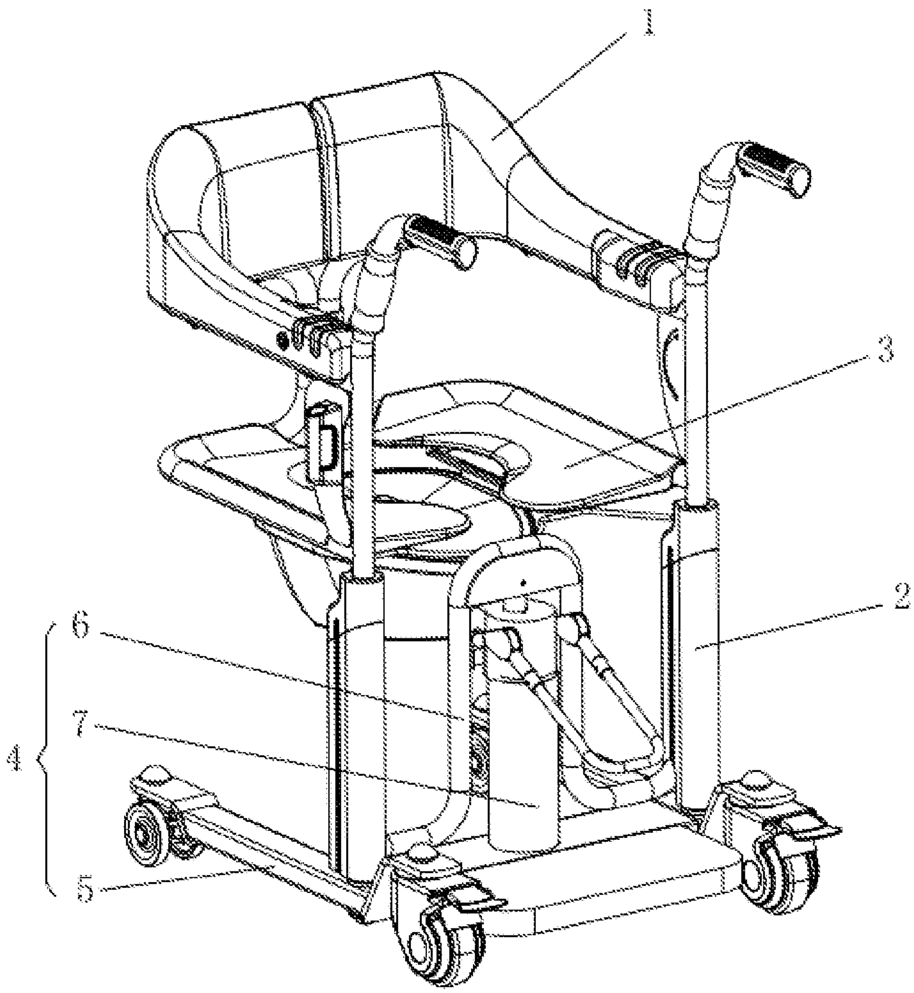
FIG. 1 is a structural schematic view of a transfer machine according to an embodiment of the present disclosure.

| Reference numerals | Name |
|---|---|
| 1 | Main body assembly |
| 2 | Lifting rod |
| 3 | Seat plate |
| 4 | Lifting assembly |
| 5 | Base |
| 6 | Connecting rod |
| 7 | Control assembly |
| 8 | Guiding rod |
| 9 | Pushing rod |
| 10 | Drive arm |
| 11 | Foot section |
| 12 | First connection |
| 13 | Second connection |
| 14 | Reinforcement structure |
| 15 | Snap |

-continued

| Reference numerals | Name |
|---|---|
| 16 | Alignment pin |
| 17 | Alignment hole |
| 18 | Transition assembly |
| 19 | Foot pedal |

DETAILED DESCRIPTION

The following will be a clear and complete description of the technical solutions in embodiments of the present disclosure in conjunction with the accompanying drawings in the embodiments. Obviously, the described embodiments are only a part of the embodiments of the present disclosure, and not all of them. Based on the embodiments in the present disclosure, all other embodiments obtained by those skilled in the art without creative effort belong to the scope of the present disclosure.

It should be noted that if the embodiments involve directional indications (such as up, down, left, right, forward, backward . . . ), the directional indications are only intended to explain the relative position relationship, movement, etc. between the parts in a particular posture (as shown in the accompanying drawings), and if the particular attitude is changed, the directional indication will be changed accordingly.

In addition, if there is a description of "first", "second", etc. in the embodiments, the description of "first", "second", etc. is intended only for descriptive purposes only and is not to be understood as indicating or implying its relative importance or implicitly specifying the number of indicated technical features. Therefore, features qualified with "first" and "second" may explicitly or implicitly include at least one such feature. In addition, the technical solutions of each embodiment may be combined with each other, but only on the basis of what can be achieved by those skilled in the art. When the combination of technical solutions contradicts each other or cannot be achieved, it should be considered that such combination of technical solutions does not exist and is not within the scope claimed by the present disclosure.

Figure 2:
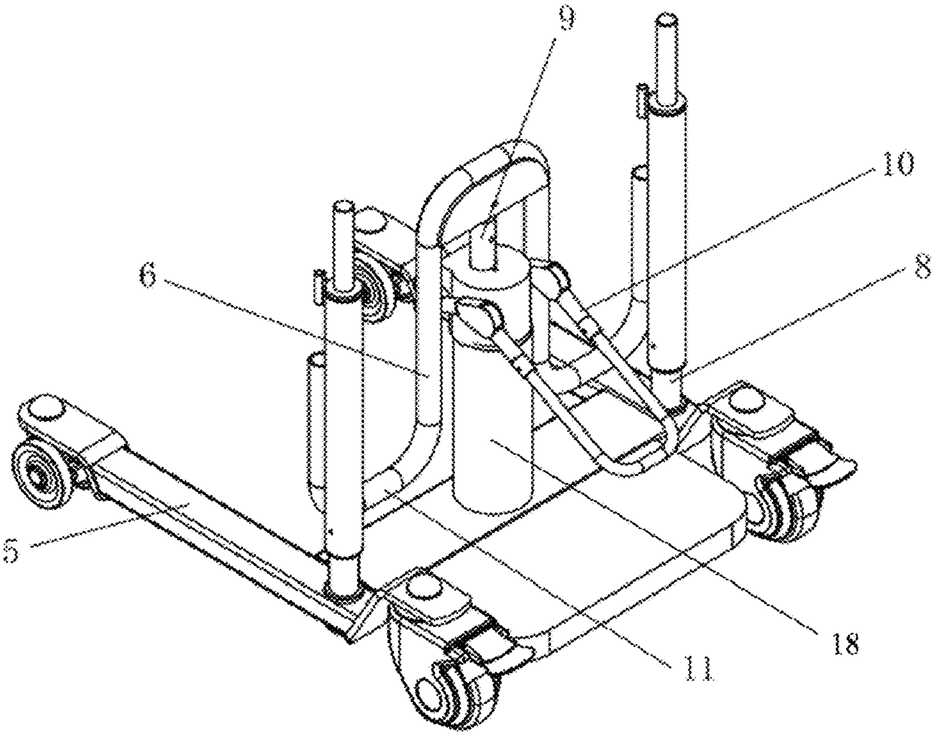
FIG. 2 is a structural schematic view of a connecting rod and a control assembly in a transfer machine according to an embodiment of the present disclosure.

Referring to FIGS. 1 and 2, the present disclosure proposes a transfer machine, applied in the field of nursing, to solve the problem of mutual movement of persons with limited mobility between wheelchairs and sofas, beds, toilets, seats, etc.

The transfer machine includes the following components.

A main body assembly 1 includes two lifting rods 2 that can move along up and down and two seat plates 3 each facing a corresponding lifting rod 2. Each seat plate 3 can rotate around the corresponding lifting rod 2 thereby enabling the seat plates 3 to close with or separate from each other.

A lifting assembly 4 includes a base 5, a connecting rod 6 and a control assembly 7 fixedly connected to the lifting rods 2.

The base 5 includes guiding rods 8 extending in an up-down direction, and each lifting rod 2 can move up and down along a corresponding guiding rod.

The control assembly 7 includes a pushing rod 9 and a drive arm 10, the pushing rod 9 is fixedly connected to the connecting rod 6, the drive arm 10 drives the lifting rods 2 to move up and down to further drive the main body assembly 1 to move up and down.

The connecting rod 6 includes two foot sections 11.

In the present disclosure, the main body assembly 1 includes two lifting rod 2 and two seat plate 3. Each seat plate 3 can be rotated around the corresponding lifting rod 2, allowing the seat plate 3 to be closed with or move away from each other, which forms an ergonomically-friendly seat plate combination configured for loading. By virtue of this design, it is possible for the user to sit for a long time and improve the comfort of the user. In use of the transfer machine, the height adjustment and position change can be achieved without the user getting up; when the transfer machine unoccupied, the caregiver may control through the control assembly 7 and does not need to apply force to the seat plate 3 in order to reset the lift automatically.

The guiding rod 8 is arranged along the up-down direction of the lifting rod 2, and the lifting rod 2 can thus move up and down along the guiding rod 8.

It is understood that there are two operating conditions of the lifting rod 2 relative to the base 5.

In Scheme 1, the lifting rod 2 only moves up and down along the guiding rod 8; in this case, the seat plate 3 is movably connected to the lifting rod 2, and the seat plate 3 rotates around the lifting rod 2.

In Scheme 2, the lifting rod 2 can both move up and down along the guiding rod 8 and can rotate around its own axis. In this case, the seat plate 3 and lifting rod 2 can be movably or fixedly connected. When the seat plate 3 and lifting rod 2 are movably connected, the lifting rod 2 and the seat plate 3 each rotate to improve the efficiency of closing or separating. When the seat plate 3 is fixedly connected to the lifting rod 2, the seat plate 3 rotates by the rotation of the lifting rod 2.

In the present disclosure, the control assembly 7 includes a pushing rod 9 and a drive arm 10. The drive arm 10 is driven by human power, for example, manually or by foot. Taking manual drive as an example, the drive arm 10 drives the pushing rod 9 to lift, which in turn drives the connecting rod 6 and the lifting rod 2 to move up and down.

In the transfer machine of the embodiments, by setting the pushing rod 9 of the control assembly 7 to drive the lifting rod 2 and connecting rod 6 to lift, the main body assembly 1 is driven to move up and down to reach a required height. The device can solve the problem of the overall inconvenience of nursing care because there is no unified standard height set between sofas, beds, toilets, seats, etc. on the market, which makes it difficult to adapt the corresponding height; the device is further aimed for the problem that the weight of the sling-type hydraulic transfer machine on the market is large and inconvenient for the caregivers to carry around and have no way to sit for a long time; the device is simple in structure and easy to carry. In use, the height adjustment and position change can be achieved without the user getting up.

As a further improvement of the above technical solution, the lifting rod 2 may be vertically arranged on the base 5, the lifting rod 2 is arranged on the guiding rod 8 along the lifting direction, and the circumference of the lifting rod 2 is connected to the connecting rod 6.

In the present disclosure, the up-down movement of the main body assembly 1 is defined as the lifting and lowering movement along the height direction. The lifting rod 2 is sleeved on the guiding rod 8 in the lift direction. The guiding rod 8 is aligned with the axis direction of the lifting rod 2, and the lifting rod 2 moves up and down along the axis direction. When the pushing rod 9 outputs a force that causes the relative movement of the connecting rod 6 (lifting rod 2) and the guiding rod 8, the main body assembly 1 gradually reaches the required lift range. In this case, the circumference of the lifting rod 2 is connected to the connecting rod 6 in a connection method in which the lifting rod 2 is welded to the connecting rod 6, and/or with a structural assembly for fixing the connecting rod 6 on the outer surface of the lifting rod 2. The structural assembly may be a removable connecting rod assembly, or a fastening assembly of bolts and nuts. The connecting rod 6 is fixedly connected to the lifting rod 2 by the structural assembly.

Figure 3:
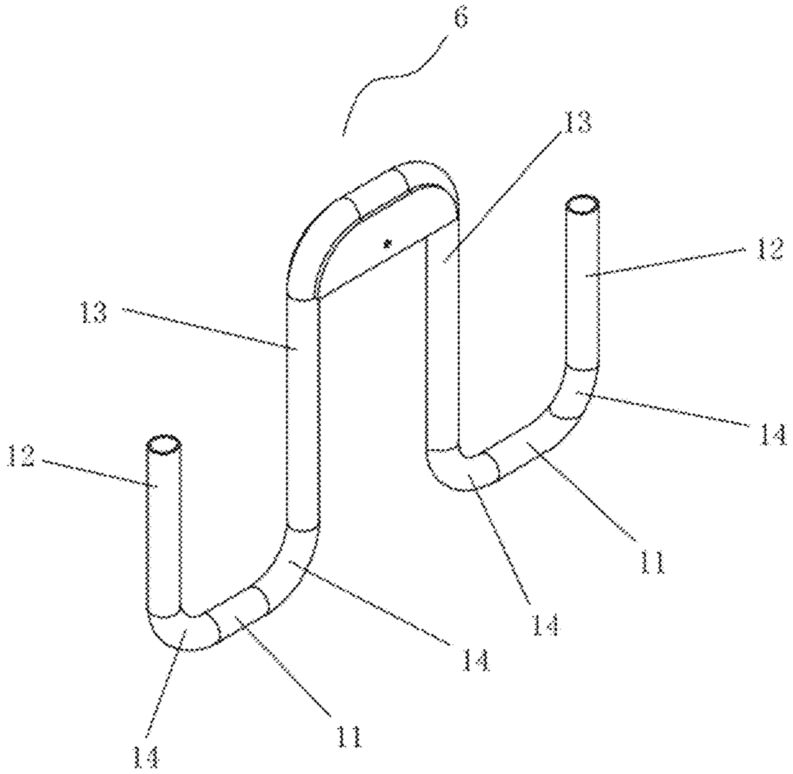
FIG. 3 is a structural schematic view of a connecting rod according to an embodiment of the present disclosure.
Figure 4:
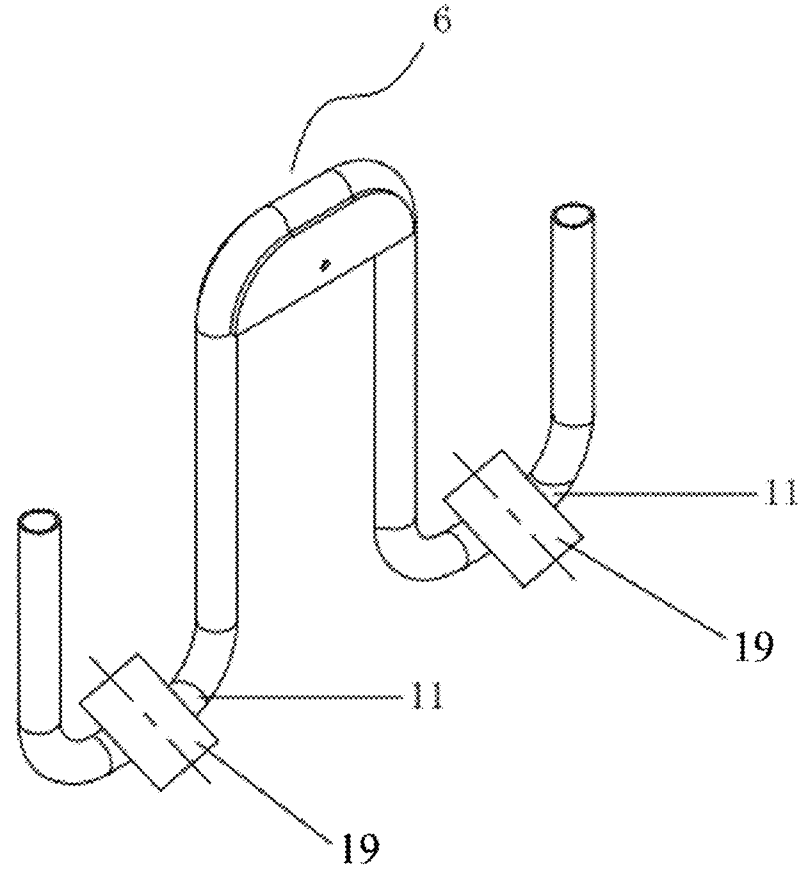
FIG. 4 is a structural schematic view of a connecting rod according to another embodiment of the present disclosure.

In the present disclosure, referring to FIGS. 3 and 4, the connecting rod 6 includes first connections 12 and second connections 13, the first connection 12 connecting the lifting rod 2 and the second connection 13 connecting the pushing rod 9; the foot section 11 is located between the first connection 12 and the second connection 13.

Specifically, the first connection section 12 and the second connection section 13 are connected to each other by the foot section 11. The first connection section 12 is connected to the lifting rod 2 and the second connection section 13 is connected to the pushing rod 9.

It should be noted that the foot section 11 is only a space for foot stepping. The first connection section 12 and the second connection section 13 are set with a height difference h; when h=0, the connecting rod 6 is arranged horizontally; when h≠0, the connecting rod 6 is arranged as a concave part.

In the present disclosure, a reinforcement structure 14 is further arranged between the foot section 11 and the first connection 12 and/or between the foot section 11 and the second connection 13.

Specifically, the transfer machine may further include the reinforcement structure 14, which is arranged between the first connection 12 and the foot section 11, or between the second connection 13 and the foot section 11; or, is arranged between the first connection 12 and the foot section 11 and between the second connection 13 and the foot section 11 at the same time.

In some embodiments, the reinforcing structure 14 is arranged with a curved bending part. The curved bending part may reduce the local stress at the bend, slow down the metal fatigue and prolong the service life compared with the structure of the right angle bending part.

It can be understood that the connecting rod 6 may achieve two effects: being configured to connect the pushing rod 9 and the lifting rod 2; and for arranging the foot section 11. In terms of structure, the connecting rod 6 may be at least one of a tube profile and a plate profile.

The foot section 11 may be integrally formed with the connecting rod 6. The foot section 11 may be at least one of a tube profile and a plate profile.

As a further improvement of the above technical solution, a foot pedal 19 is arranged on the foot section 11, which may be a rectangular pedal adapted to a footrest. The rectangular pedal may be fixed to the foot section 11 by welding; or, movably connected to the foot section 11 by fasteners. In other embodiments, the foot pedal 19 may be a square foot pedal, a shape adapted to foots, etc.

As a further improvement of the above technical solution, the seat plate 3 includes a left seat plate and a right seat plate, and an alignment hole 17 is defined at a closing of the left seat plate or the right seat plate.

Figure 5:
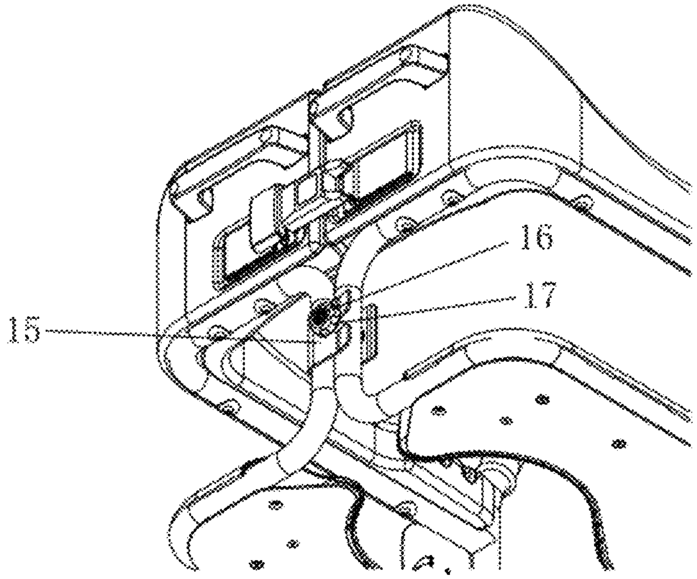
FIG. 5 is a structural schematic view of a seat plate according to an embodiment of the present disclosure.

Referring to FIG. 5, the transfer machine may further include a snap 15 and an alignment pin 16, and the alignment pin 16 cooperates with the snap 15 through the alignment hole 17 to close the left seat plate and the right seat plate.

Specifically, the seat plate 3 includes a left seat plate and a right seat plate, both of which rotate in opposite directions around the corresponding lifting rod 2. The two seat plates 3 rotate in the opposite direction around the corresponding lifting rods 2, and the number of rotation degrees between the two seat plates 3 may be controlled. When the two seat plates 3 reach the required height, the two seat plates 3 are aligned, and a closing force is manually applied to the left seat plate and the right seat plate. At this time, the two seat plates 3 are connected by the snap 15, and the alignment pin 16 fixes the snap 15 through the alignment hole 17, which in turn brings the two seat plates 3 together. Conversely, the alignment hole 17 and alignment pin 16 are disassembled, the left seat plate and the right seat plate are rotated, and the two seat plates 3 are separated without moving the user's body to achieve a mobile position, which is convenient for the user to adapt to sofas, beds, toilets, seats, etc.

As a further improvement of the above technical solution, as shown in FIG. 2, the control assembly 7 includes a hydraulic assembly 18 arranged with the drive arm 10, the hydraulic assembly 18 including the pushing rod 9. The drive arm 10 is configured to drive the hydraulic assembly 18 to make the pushing rod 9 rise or fall.

When the drive arm 10 is driven manually, the pressure value in the hydraulic circuit corresponds to $\Delta P \neq 0$, at which time a piston moves the pushing rod 9. When $\Delta P > 0$, the piston drives the pushing rod 9 upwards, which in turn drives the lifting rod 2 and the main body assembly 1 upwards; when $\Delta P < 0$, the piston moves reversely and the main body assembly 1 goes downwards. The hydraulic cylinder has self-locking, by stepping on the foot pedal or manually operating the drive arm 10, the stop of the pushing rod 9 at any height may be achieved, thereby improving the response speed and stability of the device.

When the main body assembly 1 reaches the required height or is reset, the foot pedal is stopped to be stepped on or the drive arm 10 is stopped to be manually driven, at which time the pressure value in the hydraulic circuit corresponding to $\Delta P = 0$ and the pushing rod 9 stops moving.

The transfer machine may be prepared by materials processed by electrophoresis and baking paint treatment.

The transfer machine subjected to electrophoresis and baking paint treatment can achieve the purpose of waterproof, to meet the needs of the user drenching.

The above mentioned is only some embodiments of the present disclosure, not to limit the scope of the present disclosure. Any equivalent structural transformation made by using specification and the attached drawings of the present disclosure under the inventive concept of the present disclosure, or directly/indirectly applied in other related technical fields are included in the scope of the present disclosure.

What is claimed is:

1. A transfer machine, comprising:

a main body assembly, comprising two lifting rods capable of moving along an up-down direction and two seat plates each facing a corresponding lifting rod; wherein each seat plate is capable of rotating around the corresponding lifting rod thereby enabling the two seat plates to close or separate from each other;

a lifting assembly, comprising a base, and a connecting rod and a control assembly fixedly connected to the two lifting rods;

wherein the base comprises two guiding rods extending in the up-down direction, and each lifting rod is capable of moving in the up-down direction along a corresponding guiding rod;

wherein the control assembly comprises a pushing rod and a drive arm, the pushing rod being fixed connected to the connecting rod, the drive arm driving the two lifting rods to move in the up-down direction, thereby driving the main body assembly to move in the up-down direction;

wherein the connecting rod comprises two foot sections;

wherein the connecting rod comprises two first connections and two second connections, each first connection is arranged on a corresponding lifting rod and is extending along a length direction of the corresponding lifting rod; and the two second connections are located between the two first connections and are extending in parallel to the two first connections; the two second connections are connected to the pushing rod; each foot section is located between a corresponding first connection and a corresponding second connection and is located at an end portion of the corresponding first connection and the corresponding second connection away from the two seat plates.

2. The transfer machine according to claim 1, wherein the two lifting rods are each vertically arranged on the base, each lifting rod is sleeved on the corresponding guiding rod in the up-down direction, and a circumference of each lifting rod is connected to the connecting rod.

3. The transfer machine according to claim 1, wherein a reinforcement structure is further arranged between each foot section and the corresponding first connection and/or between each foot section and the corresponding second connection.

4. The transfer machine according to claim 3, wherein the reinforcing structure is arranged with a curved bending part.

5. The transfer machine according to claim 1, wherein each seat plate comprises a left seat plate and a right seat plate, and an alignment hole is defined at a closing of the left seat plate or the right seat plate;

the transfer machine further comprises a snap and an alignment pin, and the alignment pin cooperates with the snap through the alignment hole to close the left seat plate and the right seat plate.

6. The transfer machine according to claim 1, wherein the control assembly comprises a hydraulic assembly comprising the pushing rod; the drive arm is configured to drive the hydraulic assembly to make the pushing rod rise or fall.

7. The transfer machine according to claim 1, wherein a foot pedal is arranged on each foot section.

* * * * *